United States Patent Office 2,695,893
Patented Nov. 30, 1954

2,695,893

CATALYSIS AND MANUFACTURE OF CATALYTIC MASSES

Eugene J. Houdry, Ardmore, Pa.

No Drawing. Application September 13, 1950,
Serial No. 184,711

3 Claims. (Cl. 252—451)

This invention relates to catalysis, to catalyst manufacture and to the production of contact masses for promoting catalytic reactions in which the active materials are deposited on and within suitable supports or carriers which have physical porosity due at least in part to a multiplicity of minute pores therein, as in the size range of .001" to .015". More particularly the invention has to do with ways and means to deposit solid active catalytic materials in suitable or desired amount within such supports or carriers or of impregnating the latter with materials which are initially active or which may be made active after impregnation. By preference the supports or carriers are chemically and catalytically inert and in preformed pieces, usually quite small. To render them inert they may have been subjected to elevated temperature or otherwise treated. Supports or carriers of the desired type are illustrated, described and claimed in my copending application Serial No. 179,428, filed August 15, 1950, now abandoned, and catalytic masses of high stability and activity for converting hydrocarbons formed from or by such supports are described and claimed in my copending application Serial No. 182,477, filed August 31, 1950.

A particular object of the invention is to develop ways and means to insure deposition of catalytic materials within the pores of carriers or supports. Another object is to deposit at least a part of the material within the pores of the support in catalytically active or gel form. Another object is to secure the deposited material in place. Still another object is to devise process details and steps, and modification of such details and steps, for impregnating inert but porous supports or carriers with solid active catalytic materials. Still another object is to effect such impregnation or deposition in uniform manner and at low cost. Still another object is to convert hydrocarbons by the action of improved cracking catalysts. Still other objects and advantages will be apparent from the detailed description which follows.

Briefly stated the invention consists in floating or flowing solid active catalytic material in very finely divided or peptized form into the minute pores of the carrier by the agency of a liquid vehicle which may be any suitable type of wetting agent including water or a solution of one or more additive components of the active material to be deposited within the carrier. While the process of the present invention is directly applicable to depositing or incorporating any of a vast number of catalytic materials within carriers of the described type, illustrations of the invention will be confined to use in connection with compounds of silica and alumina for promoting cracking, converting and transforming operations on hydrocarbons.

Any suitable support or carrier which is catalytically inert, stable physically and chemically and has interconnected or intercommunicating pores of the specified size may be utilized. The support should be highly resistant to temperature changes and shocks as well as to attrition in order to be available for use in moving bed as well as in fixed bed operations. Shaped and properly formed and sized pieces of ceramic material such as partly fused alumina, silica, magnesia, and compounds of the same and of other porcelaneous components as set forth in my aforesaid copending application Serial No. 179,428 have the required properties and characteristics.

In order to effect successful and reasonably uniform deposit of solid material within the pores of the support or carrier the solids must be reduced to a particle size considerably smaller than the size of the pores, actually to one quarter the size of the pores or even smaller. Hence the process of the present invention involves the science of dispersion of solids in liquids. The methods for obtaining colloidal dispersions herein utilized are mechanical and chemical, such for example as micronizing powdered solids in a colloidal mill, prolonged mixing and grinding in a ball mill, and/or peptizing the solids in the liquid vehicle. In many instances it is necessary to adjust and to maintain control of the pH of the mixture to avoid gelling or solidification on the one hand or precipitation of powdered solids on the other. In other words, the powdered or peptized solids must remain in thoroughly dispersed condition in the liquid vehicle during impregnation of the supports or carriers. Vacuum, pressure, or a combination of vacuum and pressure may be utilized to assist in effecting penetration of the dispersed mixture within the pores.

Although many types or forms of active starting materials may be employed in the manufacture of desirable catalytic masses in accordance with the present invention, it is believed that the following examples will be sufficient to illustrate adequately and clearly the required process steps as well as to indicate the scope and commercial value of the invention. The examples, as previously indicated, are confined to catalysts made up of active compounds of silica and alumina for hydrocarbon conversion and are arranged under four headings, called solutions, as follows:

*Solution No. 1*

Starting materials: prefabricated or preformed catalytic compositions of any desired materials and in active form.

EXAMPLE 1

Selected starting material of 48 activity index is a commercial prefabricated silica-alumina catalyst whose ratio of components by weight is 87.5% $SiO_2$:12.5% $Al_2O_3$ in coarse powder gel form obtained by coprecipitation of N-Brand sodium silicate and sodium aluminate plus ammonium sulphate, dried, base exchanged and washed.

The selected supports or carriers are of porcelain of 38% porosity in the form of hollow cylinders with outside diameter of .09" and inside diameter of .015", with wall thickness of .0375", and pore sizes in the range of .005" to .015".

The steps of process are:

(a) Micronizing the above catalyst composition in a colloidal mill to obtain a fine powder of the order of 2 to 3 microns;

(b) Dispersing 2 parts by weight of such powder in 5 parts by weight of water in a ball mill operation for about 10 hours to obtain a thoroughly dispersed mixture;

(c) Immersing the supports or carriers under vacuum for about 15 minutes in the the thoroughly dispersed mixture;

(d) Draining and then drying the impregnated supports or carriers at temperature of the order of 250° F. sufficiently to remove the water;

(e) Screening and shaking the dried mass to remove surface material and fines (to be reused in the ball milling step (b)).

At the end of the operation and after bone dry air treatment for 4 hours at 1350° F. the supports or carriers were found to be impregnated with 45 grams per liter of active catalyst (48 activity). In moving bed cracking operations on East Texas gas oil with this catalytic mass in 10 minute on-stream periods, the following results were obtained.

| Temp. | Charging rate, liters of oil per hour per kg. of active catalyst | Yield | | |
|---|---|---|---|---|
| | | Gasoline, percent by vol. chg. | Wet Gas, percent by wt. chg. | Coke, percent by wt. chg. |
| 900° F | 11.7 | 32.5 | 11.6 | 2.26 |
| 800° F | 6.6 | 30.0 | 5.5 | 1.90 |

EXAMPLE 2

Selected catalytic starting material is the same as in Example 1, but the selected supports or carriers are of porcelain of 43% porosity with pores in the size range of .01" to .015" in the form of hollow cylinders of an outside diameter of .15" with two spaced longitudinal slots therethrough of about .03" width to provide wall thickness of about .03". Impregnation of the supports or carriers was effected by process steps identical with (a), (b), (c), (d) and (e) of Example 1, except that in the ball milling operation (b) there were 2 parts by weight of micronized powder to only 3.4 parts by weight of water. The quantity of active catalyst per liter of supports or carriers was 70 grams.

This catalytic mass in a fixed bed cracking operation charging East Texas gas oil for 10 minute on-stream periods at 800° F. and charging rate of 4.3 liters of oil per hour per kg. of active catalyst, produced a yield of 40.6% gasoline by volume, 12.6% wet gas by weight and 4.05% coke by weight of charge.

Comments on solution No. 1:

Extended ball milling of the micronized powder in the water more than doubles the amount of active catalyst entering the pores of the support or carrier over mere thorough mixing, and also diminishes considerably the amount of fines recovered from the dried mass during screening and shaking operations. Apparently some peptization of the powdered catalyst occurs during ball milling in water.

Catalytic masses according to Examples 1 and 2 are economical to produce, plant investment is small and equipment is simple. In fact, impregnation can be effected at the site of the cracking plant and when the activity of the catalyst diminishes from use, it is a simple matter to dissolve out the catalyst from the support with acid or caustic and to reimpregnate the recovered support with fresh catalyst.

To assist impregnation, wetting or other agents which help or promote the dispersion of solids in water or the stabilizing of the dispersed solution, may be added. Among such agents are gelatin, sugar, soap, nitric acid, hydrochloric acid, etc.

After immersing the supports or carriers in the thoroughly dispersed mixture (step (c)) and completion of steps (d) and (e), it is usually advantageous to follow with one immersion in a salt solution of either component and then to gel such solution, thereby to produce a gel inside the supports or carriers to strengthen the active catalytic material already deposited and to keep the latter securely in place as by a binding and cementing operation, the new gel structure taking on the nature of a web in the minute pores and communicating channels between and among the pores so as to aggregate the powder deposited therein. This additional procedure is highly desirable and definitely of importance whenever the catalytic masses are to be used in moving bed operations. It can be a separate immersion or impregnation, as indicated above, or the salt solution may be mixed with or used in place of water or other liquid vehicle in the ball milling step (b).

Such additional impregnation and gelling does not greatly affect the yields but as a rule the changes are favorable. For example a contact mass containing commercial catalyst (87.5% $SiO_2$.12.5% $Al_2O_3$) of 40 activity index produced a yield of 38.4% gasoline, 12% wet gas and 3.2% coke in a fixed bed operation; the same catalyst after impregnation with aluminum nitrate decomposed to $Al_2O_3$ to change the active material to 83% $SiO_2$.27% $Al_2O_3$ then gave a yield of 39.4% gasoline, 10.1% wet gas and 3.2% coke in the same fixed bed operation.

*Solution No. 2*

Starting materials: commercial alumina powder, catalyst grade; silicon salt solutions.

EXAMPLE 3

The selected starting materials and their proportions by weight are:

27.25 parts commercial alumina powder, catalyst grade;
37.85 parts ethyl ortho silicate;
25.4 parts ethyl alcohol;
9.5 parts water.

The selected supports or carriers are of porcelain of 43% porosity in the form of hollow cylinders with outside diameter of .09" and inside diameter of .015", with wall thickness of .0375" and pore sizes in the range of .008" to .012".

The steps of process are:
(1) Dispersing the alumina powder by peptization in the solution of silicon, alcohol and water;
(2) Immersing the supports or carriers under vacuum in the dispersed solution;
(3) Draining, and driving off the alcohol from the impregnated supports or carriers by heat, as at about 90° C., to produce silica gel;
(4) Synerizing the impregnated supports or carriers, with steam if desired to reduce time of syneresis;
(5) Drying the impregnated supports or carriers.

At the end of the operation and after bone dry air treatment the supports or carriers contained 80 grams per liter of alumina-silica catalyst in the ratio by weight of 72 $Al_2O_3$:28 $SiO_2$ with activity index of 48. In a moving bed cracking operation at 900° F. on East Texas gas oil charged at the rate of 6.2 liters of oil per hour per kg. of active catalyst for 10 minute on-stream periods the yield was 35.1% gasoline by volume of charge, 11.2% wet gas by weight and 1.88% coke by weight of charge.

Comment: For the ethyl ortho silicate there may be substituted sodium silicate or silicon tetrachloride. When sodium silicate is used as the substitute, step (3) of the above process is modified to include dipping the alcohol-free supports or carriers in a suitable solution, such as a solution of HCl, to produce silica gel, and step (5) is also expanded to include removal of impurities, i. e. sodium and its compounds, by base exchange and washing. When silicon tetrachloride is substituted for the ethyl ortho silicate, the alumina powder must be well dried before mixing with the silicon tetrachloride and only a partial vacuum is required during the immersion step (2).

EXAMPLE 4

The selected catalyst materials and their proportions by weight are 16.3 parts commercial alumina powder, catalyst grade, 83.7 parts sodium silicate N-Brand 40° Baumé diluted in water to 32° Baumé.

The selected supports or carriers are of porcelain of 43% porosity with pore sizes in the range of .012" to .015", in the form of hollow cylinders of an outside diameter of .15" with two spaced longitudinal slots therethrough of about .03" width to provide wall thickness of about .03"

The steps of process are:
(1a) Dispersing the alumina powder in the sodium silicate solution;
(2a) Immersing the supports or carriers under vacuum in the dispersed solution;
(3a) Draining and then dipping the impregnated supports or carriers in a proper solution to produce silica gel, such as a solution of HCl;
(4a) Draining and synerizing the impregnated supports or carriers, with steam if desired to reduce time of syneresis;
(5a) Drying and removing impurities from the impregnated supports by base exchange with ammonium nitrate.

At the end of the operation the supports or carriers, after bone dry heat treatment, contained 115 grams of active alumina-silica catalyst in the ratio by weight of 45% $Al_2O_3$:55% $SiO_2$ with activity index of 40. In a fixed bed cracking operation at 900° F. on East Texas Gas Oil charged at the rate of 4.7 liters of oil per hour per kg. of active catalyst for 10 minute on-stream periods, the yield was 37.4% gasoline by volume of charge, 12% wet gas by weight, and 1.98% coke by weight of charge; at a faster charging rate, namely 7.8 liters of oil per hour per kg. of active catalyst, the other conditions remaining the same, the yield was 31.6% gasoline, 9% gas and 1.25% coke.

*Solution No. 3*

Starting materials: commercial silica gel; aluminum salt solutions.

EXAMPLE 5

The selected starting components for the active catalytic material and their proportions by weight are 8.5 parts commercial silica gel and 91.5 parts of saturated aluminum chloride solution as $AlCl_3.6H_2O$.

The selected supports or carriers are the same as utilized in Example 3, except that the pore sizes are in the range of .005" to .015".

The steps of process are:

(1b) Dispersing the silica gel by peptization in the aluminum salt solution either by stirring or by ball milling;

(2b) Immersing the supports or carriers under vacuum in the dispersed solution for about 15 minutes;

(3b) Draining and immersing the impregnated supports or carriers in a proper solution to produce an alumina gel, as in an ammonia solution for one hour;

(4b) Draining and synerizing the impregnated supports or carriers, usually in steam (at 175° F. for 2 hours) to reduce the time of syneresis;

(5b) Drying and removing by heat the salts formed during the gelling step.

At the end of the operation the supports or carriers contained 49.5 grams per liter of alumina-silica catalyst in the ratio by weight of 55 $Al_2O_3$:45 $SiO_2$ with activity index of 48. In a moving bed cracking operation at 800° F. on East Texas Gas Oil charged at the rate of 6 liters of oil per hour per kg. of active catalyst for 10 minute on-stream periods the yield was 30% gasoline by volume of charge, 6.3% wet gas by weight and 2.31% coke by weight of charge.

Comments on Solution No. 3:

For aluminum chloride there may be substituted aluminum nitrate, sodium aluminate, potassium aluminate or aluminum acetate with equally good results, provided that the time of gelling and of syneresis is suitably adjusted and that salt removal is effected when necessary. The time of gelling and of syneresis will vary according to the ratio of alumina to silica and according to the nature of the raw materials.

*Solution No. 4*

Starting materials: commercial alumina powder, catalyst grade; commercial silica gel; aluminum salt solutions.

(The procedure is very similar to that of Solution No. 1, the exception being that the desired proportions of alumina to silica are obtained by weighing the above commercial components and then mixing them thoroughly with grinding, either in wet or dry state, for the required period—this latter factor being extremely important.)

EXAMPLE 6

The selected starting components for the active catalytic material and their proportions by weight are:

21.4 parts commercial alumina powder, catalyst grade;
4.6 parts commercial silica gel;
58.5 parts water;
15.5 parts saturated aluminum nitrate solution.

The selected supports or carriers are of porcelain of 43% porosity having a multiplicity of physical pores in the size range of .005″ to .015″ in the form of plain cylinders or plugs of .090″ diameter.

The steps of process are:

(1c) Dispersing the alumina and the silica thoroughly in the water and aluminum nitrate solution by grinding in a ball mill for an extended period, as 22 hours;

(2c) Immersing the supports or carriers under vacuum in the mixture from the ball milling operation;

(3c) Draining and then drying the impregnated supports or carriers at about 700° F.;

(4c) Screening and shaking the dried mass to remove surface material and fines (for reuse in ball milling step (1c));

(5c) Repeating twice the series of steps (2c), (3c), (4c).

On completion of the above operations the supports or carriers were heat treated at 1400° F. for five hours in air containing 10% steam. The mass then contained 163 grams of active catalyst in the ratio of 82% $Al_2O_3$:18% $SiO_2$ per liter with an activity index of 50. In a moving bed cracking operation on East Texas Gas Oil charged at the rate of 3.1 liters of oil per hour per kg. of active catalyst, time on-stream 10 minutes, the yield was 35.6% gasoline by volume of charge, 14.7% wet gas by weight and 2.8% coke by weight of charge.

EXAMPLE 7

The selected starting components for the active catalytic material and their proportions by weight are:

16.4 parts commercial alumina powder, catalyst grade;
10.2 parts commercial silica gel;
57.6 parts water;
15.8 parts saturated aluminum nitrate solution.

The selected supports or carriers are of porcelain of 53% total porosity having a multiplicity of physical pores in the size range of .012″ to .015″ in the form of hollow cylinders having an outside diameter of .2″ and three longitudinal slots therethrough to provide walls of about .025″ in thickness. The process steps of manufacture are identical with steps (1c)–(5c) described in Example 6. The resulting catalytic mass after bone dry air treatment for 3 hours at 1300° F. contained 280 grams of active catalyst per liter, the catalyst comprising 63% $Al_2O_3$: 37% $SiO_2$ by weight and having an activity index of 47. In a fixed bed cracking operation at 850° F. on East Texas Gas Oil charged at the rate of 2.7 liters of oil per hour per kg. of active catalyst for 10 minute on-stream periods the yield was 46.5% gasoline by volume of charge, 11.1% wet gas by weight, and 2.55% coke by weight of charge.

The catalyst manufacturing process set forth above, in its variations and modifications, is the result of a considerable amount of study, research and experimentation. Large numbers of catalyst have been made and tested. In order successfully to deposit solid active catalytic material in a substantially uniform manner within suitable supports or carriers having pores of the designated size, close attention must be given to the ball milling or peptizing step—(b), (1), (1a), (1b) or (1c)— to insure that the solid catalytic material shall be in the proper particle size and condition to be floated or carried into the pores of the support by the liquid vehicle, and that it shall be thoroughly dispersed in the liquid vehicle and continue to be dispersed therein during the immersion step—(c), (2), (2a), (2b) or (2c). There will be variation with the composition of each solution or liquid forming the vehicle, particularly so far as time of mixing or ball milling is concerned. In many instances the mixture will require close watching and checking of its fluidity or viscosity. Frequently a mixture which is fluid at the start of the ball milling or peptizing operation becomes viscous instead of more fluid; usually a slight change in the pH of the solution will restore fluidity. It is, of course, essential that the dispersion remain stable during the time necessary for the immersion operation. Impregnation of the supports or carriers under vacuum, while not necessary, is preferred in all cases. For good catalytic activity it is necessary to obtain good gel formation when one or more of the selected components are not in active form at the time of impregnation. Consequently the nature of the solution to be gelled must be studied. Ammonium hyroxide, hydrochloric acid or in certain instances other acids, may be preferred, according to the nature of the reactants. The time for the setting of the gel in the solution is easily determined by experimentation in each case and may vary from minutes to hours. Likewise the time of syneresis will differ with different compositions and may vary from 45 minutes to 24 hours. It can usually be speeded up by the use of steam. In the case of active compounds of alumina and silica it has been found that when salts other than those of the two desired components remain in the gel after drying, removal of such salts by washing and, in most cases by base exchange as well, is absolutely necessary to obtain maximum catalytic activity and stability.

In the manufacture of catalysts for converting hydrocarbons, compounds of beryllium, zirconium and magnesium can be substituted for compounds of aluminum, and the results obtained are specific to the compounds employed. However, as previously indicated, the invention is not limited to the production of catalysts for converting hydrocarbons only but has practical application to all known catalytic reactions, and particularly wherever it is desirable or advantageous to increase the weight of the catalytic mass or to disseminate or spread the catalytic material in an extended manner while fully protected and supported against attrition and disintegration. As described the supports or carriers may be impregnated with all the catalytic materials at one time in active form, or by at least one component in active form and the other or other components made active after impregnation. Stated otherwise, an active base or promoter impregnated with other catalytic material may be deposited within the pores of the supports or carriers, the other catalytic material to be activated following deposition. Such active bases or promoters are well known in the art and include active forms or compounds of aluminum, silicon, magnesium, zirconium, beryllium, etc. For hydrocarbon converting operations combinations or compounds of two or more of such bases or promoters are suitable. For other catalytic reactions such as hydrogenation, dehydrogenation, desulpherizing, oxidation, synthesis, etc. there is an extremely wide range of combinations or compounds in which such elements as silver, nickel, cobalt, iron, copper, manganese, platinum, tungsten, thorium, lead, zinc, chromium, molybdenum, vanadium, etc. may be included along with said active bases or promoters as will be apparent to those skilled in the art of catalysis.

The solutions and the various examples herein presented are believed clearly to indicate that the present invention provides practical ways to deposit desired quantities of active catalytic material in solid form, and especially in extremely finely divided particles, within the minute pores of stable supports or carriers regardless of whether the catalyst is a single finely divided material or whether it is a composite or compound of two or more active materials, such as plural gels in which the catalytic effect appears to be due to some interfacial relation of the components. The processes herein disclosed provide practical ways of making physically stable catalytic masses of controlled activity from commercial catalytic materials readily available in the open market.

While the invention has been herein disclosed in what are now believed to be preferred processes and steps of process, it is to be understood that the invention is not to be limited to the specific details set forth by way of illustration but covers all changes, modifications and adaptations within the scope of the appended claims.

I claim as my invention:

1. Process of impregnating stable, inert supports having a multiplicity of minute pores therein with particles of solid catalytic material which comprises dispersing the solid active material in very finely divided form in a liquid vehicle containing in solution a gellable material, immersing said supports in said liquid dispersion so as to flow said fine particles into said pores and at the same time impregnate said pores with said solution of gellable material, precipitating said gellable solution within said pores so as to deposit a gel therein around said particles, and then drying said precipitated gel.

2. Process of making catalytic masses containing catalytic material made up of a plurality of components which comprises dispersing finely divided particles of one component of said active material in a liquid solution of another component of said active material, immersing in the resulting mixture stable inert supports having a multiplicity of minute pores therein so as to flow said fine particles into said pores and at the same time impregnate said pores with said liquid solution of active material, precipitating said active material from said solution so as to deposit a gel thereof within said pores and around said particles, and then drying said precipitated gel.

3. Process of making catalytic masses containing catalytically active material made up of a plurality of components which comprises dispersing finely divided particles of one component of said active material in a liquid solution of another component of said active material, immersing in the resulting mixture stable inert supports or carriers having a multiplicity of minute physical pores therein, draining, and then dipping the impregnated supports in a solution which produces gelling of the material in solution within the pores of said supports, draining and effecting synerization of the gel thus produced, and then drying and removing impurities from said impregnated supports to leave the deposited powder and gel securely in place within said pores and in fully active and stable form.

References Cited in the file of this patent

UNITED STATES PATENTS

| Number | Name | Date |
|---|---|---|
| 1,979,187 | Bindley | Oct. 30, 1934 |
| 2,029,786 | Myddleton | Feb. 4, 1936 |
| 2,249,613 | Kinneberg | July 15, 1941 |
| 2,500,801 | Church | Mar. 14, 1950 |
| 2,563,650 | Heinemann | Aug. 7, 1951 |